(12) United States Patent
Harrold et al.

(10) Patent No.: US 7,017,415 B2
(45) Date of Patent: Mar. 28, 2006

(54) APPARATUS FOR SENSING PRESSURE FLUCTUATIONS IN A HOSTILE ENVIRONMENT

(75) Inventors: Ronald T. Harrold, Murrysville, PA (US); Zal N. Sanjana, Pittsburgh, PA (US); Richard D. Holm, Pittsburgh, PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 171 days.

(21) Appl. No.: 10/387,114

(22) Filed: Mar. 12, 2003

(65) Prior Publication Data

US 2004/0177694 A1    Sep. 16, 2004

Related U.S. Application Data

(63) Continuation-in-part of application No. 10/262,332, filed on Oct. 1, 2002, and a continuation-in-part of application No. 09/965,715, filed on Sep. 27, 2001, now Pat. No. 6,668,655.

(60) Provisional application No. 60/326,477, filed on Oct. 1, 2001.

(51) Int. Cl.
*G01L 11/00* (2006.01)
(52) U.S. Cl. ............... 73/702; 73/116; 73/117.2
(58) Field of Classification Search .......... 73/700–756, 73/115–117.2
See application file for complete search history.

(56) References Cited

U.S. PATENT DOCUMENTS

| 4,054,255 | A |   | 10/1977 | Magenheim |
| 4,158,168 | A |   | 6/1979  | Harrold |
| 4,335,613 | A |   | 6/1982  | Luukkala |
| 4,557,106 | A |   | 12/1985 | Ffowcs Williams et al. |
| 4,590,803 | A |   | 5/1986  | Harrold |
| 4,979,798 | A | * | 12/1990 | Lagakos et al. ............... 385/12 |
| 5,408,439 | A | * | 4/1995  | Urmson ........................ 367/1 |

(Continued)

OTHER PUBLICATIONS

Harrold, Ronald T., et al. Acoustic waveguide sensors for smart structures and skins. Fiber Optic Smart Structures and Skins II, Sep. 5-8, 1989, Boston, MA, pp. 462-470. Bellingham, WA: SPIE, 1990. SPIE vol. 1170.

(Continued)

*Primary Examiner*—William Oen
*Assistant Examiner*—Jermaine Jenkins

(57) ABSTRACT

A pressure sensor (52) for a harsh environment such as the combustion chamber (58) of a gas turbine engine (50). The pressure sensor includes an acoustic waveguide (60) having a sensing portion (66) exposed to the combustion gas in the combustion chamber. Modulations in an acoustic signal passing through the acoustic waveguide are sensed and correlated to pressure fluctuations in the combustion gas. The sensing portion of the waveguide includes a core acoustic waveguide element (42) covered by a coating material (44). The coating material not only protects the core from the harsh environment, but it also improves the efficiency of the transfer of energy from the combustion gas into the waveguide because it provides a stepped transition from the acoustic impedance of the gas to the acoustic impedance of the core material. The protective coating may have a plurality of layers (46, 48) and/or it may include a graded material (78, 80) having an acoustic impedance value that varies across its depth.

19 Claims, 3 Drawing Sheets

U.S. PATENT DOCUMENTS

| | | |
|---|---|---|
| 5,428,951 A | 7/1995 | Wilson et al. |
| 5,544,478 A | 8/1996 | Shu et al. |
| 5,629,906 A * | 5/1997 | Sudol et al. ............... 367/162 |
| 5,677,489 A | 10/1997 | Spillman, Jr. |
| 5,706,643 A | 1/1998 | Snyder et al. |
| 6,487,909 B1 | 12/2002 | Harrold et al. |
| 6,668,655 B1 * | 12/2003 | Harrold et al. ............... 73/660 |

OTHER PUBLICATIONS

Harrold, Ronald T., et al. Quasi-Residual Strain and Modull Measurements in Materials Using Embedded Acoustic Waveguides. Nondestructive Evaluation for Process Control in Manufacturing, Dec. 3-5, 1996, Scottsdale, AZ, pp. 13-23. Bellingham, WA: SPIE, 1996. SPIE vol. 2948.

* cited by examiner

APPARATUS FOR SENSING PRESSURE FLUCTUATIONS IN A HOSTILE ENVIRONMENT

This application is a continuation in part of and claims benefit of the Sept. 27, 2001, filing date of U.S. application Ser. No. 09/965,715, now U.S. Pat. No. 6,668,655. This application is also a continuation-in-part of and claims benefits of the Oct. 1, 2002, filing date of U.S. patent application Ser. No. 10/262,332, which in turn claim benefit of the Oct. 1, 2001, filing date of provisional application No. 60/326,477.

FIELD OF THE INVENTION

This invention relates generally to the field of pressure sensors, and more particularly to a pressure sensor that may be used to detect pressure fluctuations in a hostile fluid environment such as exists in the combustor of a gas turbine engine.

BACKGROUND OF THE INVENTION

Gas (combustion) turbine engines are used for generating power in a variety of applications including land-based electrical power generating plants. The precise control of combustion dynamics is critical for the proper operation of a gas turbine engine. The fuel and air mixture is ignited and burned in the combustor section of a gas turbine engine under extremely high pressure and temperature conditions. Dynamic pressure waves having a frequency ranging from a few hundred hertz to a few thousand hertz occur during the combustion process. If these pressure pulses become excessive, mechanical damage can result in the turbine combustor and downstream components. Increasing the flame temperature can stabilize the combustion process. This approach, however, will increase the production of undesirable nitrogen oxide emissions. Accordingly, there must be a balance between the concerns of reduced emissions and stable combustion.

It is known to utilize active control of the combustion process in order to achieve stable, efficient, regulation-compliant operation of a gas turbine engine. Active control systems typically include a sensor for detecting a parameter responsive to the combustion process and a control element for controlling the combustion process in response to the measured parameter. One or more such parameters may be measured; for example, the parameter may be the pressure in the combustion chamber, a sound produced by the engine, a predetermined wavelength of electromagnetic energy generated by the combustion process, or the exhaust concentration of a particular combustion byproduct such as carbon monoxide. One such gas turbine active combustion control is described in U.S. Pat. No. 5,428,951, incorporated by reference herein, wherein a pressure sensor is used to detect combustion-induced pressure oscillations. The mounting arrangement for the pressure sensor is not described in that patent. Another U.S. Pat. No. 5,706,643, incorporated by reference herein, illustrates an active gas turbine control system wherein a pressure probe is mounted to a combustor wall, with a pressure signal being routed to the outside of the engine case by an electrical wire connection. The pressure probe and wire connection are thus exposed to the harsh environment inside the engine casing.

Gas turbines are known to include a compressor producing compressed air, a combustor combusting a fuel in the compressed air to produce a combustion gas, and a turbine receiving the combustion gas and expanding the combustion gas to extract mechanical energy. FIG. 1 illustrates a gas turbine engine 10 provided by Siemens Westinghouse Power Corporation, the assignee of the present invention. The engine 10 includes a combustion chamber 12 defined by a combustor wall 14. A burner assembly 16 provides a mixture of fuel and air for combustion in the combustion chamber 12 where the combustion gas is produced. These components are housed within a casing 18 that forms the atmospheric pressure boundary of the machine. A pressure transducer 20 is mounted outside the casing 18 for measuring pressure fluctuations within the combustion chamber 12 for use with an active combustion control system. The transducer 20 is installed into a mounting block 22 having a fluid connection to the combustion chamber 12. The fluid connection is established through a hole 24 formed through the "top hat" of the casing 18 to which is connected a communication tube 26. The communication tube 26 extends along the longitudinal length of the burner assembly 16 and is connected, such as by welding, to a port 28 formed on the combustor wall 14. The port 28 is installed in the same axial plane as an end of a pilot cone 30 of the burner assembly 16. A fitting 32 is welded to the casing 18 and the mounting block 22 is connected to the fitting 32. A damping tube 34 is connected to the opposed side of the mounting block 22 via union 36 in order to eliminate the acoustic resonance inherent in the length of the communication tube 28. This arrangement has the advantage of keeping the transducer 20 outside of the casing 18, which simplifies replacement of the transducer and avoids exposure of the transducer 20 to the environment inside the engine 10. However, this system permits the pressure internal to the engine 10 to extend beyond the casing 18, and therefore, the pressure boundary created by the mounting block 20, fitting 32, union 36 and damping tube 34 must be properly protected against mechanical damage. Furthermore, the volume enclosed by the communication tube 26 and damping tube 34 may affect the pressure oscillations experienced by the transducer 20.

Accordingly, an improved apparatus for sensing pressure oscillations in the harsh environment of a gas turbine engine is desired.

SUMMARY OF THE INVENTION

A pressure sensor for use in a hostile fluid environment is described herein as including: a core acoustic waveguide element exhibiting a first acoustic impedance; and a coating disposed over the core acoustic waveguide element, the coating exhibiting a second acoustic impedance different than the first acoustic impedance. The second acoustic impedance may be a value between the first acoustic impedance and the acoustic impedance exhibited by a fluid surrounding the coating. The coating may include a plurality of layers each exhibiting different acoustic impedance or it may be a graded material exhibiting a range of acoustic impedance values across its depth. The coating may be a layer of material having a length along the core acoustic waveguide element approximately equal to an integer multiple of a wavelength in the material of an acoustic wave transmitted through the core acoustic waveguide element; and the length of the layer of material may be approximately equal to an integer multiple of a wavelength in the core acoustic waveguide element of the acoustic wave transmitted through the core acoustic waveguide element. In one embodiment, the core acoustic waveguide element is platinum, and the coating includes a first layer of fused silica disposed on the platinum and a second layer of mullite disposed on the first layer.

A pressure sensor for monitoring a combustion process in a gas turbine engine having a compressor producing compressed air, a combustor combusting a fuel in the compressed air to produce a combustion gas, and a turbine receiving the combustion gas is further described herein as including; an acoustic waveguide having a portion exposed to the combustion gas; a transducer transmitting an acoustic signal into the acoustic waveguide; and a transducer receiving the acoustic signal having passed through the acoustic waveguide.

BRIEF DESCRIPTION OF THE DRAWINGS

These and other advantages of the invention will be more apparent from the following description in view of the drawings that show.

DETAILED DESCRIPTION OF THE INVENTION

Figure 1:
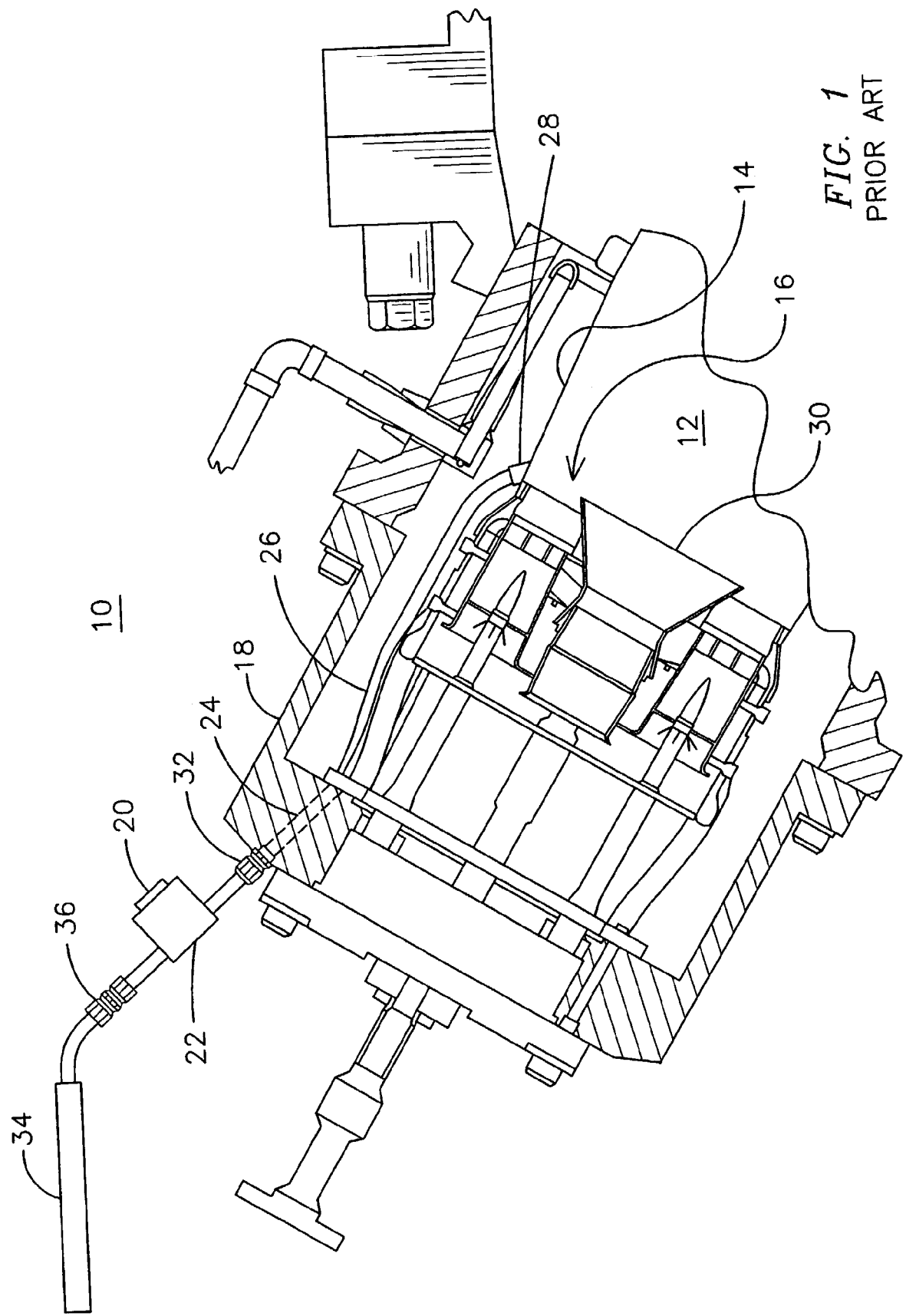
FIG. 1 is a partial cross-sectional view of a prior art gas turbine having a connection for an externally mounted combustion chamber pressure sensor.

The present invention involves the use of an acoustic waveguide to measure pressure fluctuations in a fluid environment, such as in the harsh fluid environment of the combustor of a gas turbine engine. A portion of an acoustic waveguide (AWG) is positioned for exposure to a working fluid such as the combustion gas produced by a gas turbine combustor. An acoustic wave is passed through the waveguide, and pressure fluctuations in the surrounding working fluid cause modulation of the acoustic wave as it passes through the acoustic waveguide. This modulation is a result of pressure-induced changes in the material of the acoustic waveguide that influence the attenuation of the signals passing through the waveguide. The modulation of the signal as it passes through the waveguide is sensed and correlated to changes in the pressure of the working fluid. The signal passing through the waveguide may be a predetermined test signal, such as a 70 kHz continuous wave, or it may be the background noise signal generated by the engine itself.

U.S. Pat. No. 4,590,803, incorporated by reference herein, describes how an embedded waveguide may be sensitive enough to detect the impact of a single grain of salt or the touch of a feather. U.S. Pat. No. 6,487,909, also incorporated by reference herein, describes how an acoustic signal may be transmitted to the interior of a gas turbine via an acoustic waveguide and used to interrogate a thermal barrier coating on the turbine blades and vanes. Tests of one such a system have demonstrated that the background noise signal generated in the 70 kHz range with a platinum acoustic waveguide was in the 200–400 mV range. The present inventors believe that the level of background noise sensed by the acoustic waveguide can be reduced to approximately 100 mV or less by acoustically isolating the sensors that are coupled to the waveguide from the engine structure.

For a gas turbine combustion control system application, it is useful to detect transient combustion pressure variations of $\pm 210$ gm/cm$^2$ (3 lb/in$^2$) over a wide dynamic range (0–5,000 Hz). Assuming that an acoustic waveguide has a surface area of 5 cm$^2$ exposed to the combustion gas environment inside a gas turbine engine, the force exerted on this surface area by such pressure variations is equal to Pressure multiplied by Area or 201×5=1,050 gm. The energy transfer at the boundary between the working fluid and the acoustic waveguide will be a function of the respective acoustic impedance values of the two materials. Acoustic impedance (Z) is density multiplied by wave velocity. Acoustic wave reflection ($R_0$) is a measure of the energy transfer at the boundary, and it is defined as the ratio of the difference and the sum of the respective acoustic impedance values of the two materials, i.e. $R_0=(Z_2-Z_1)\div(Z_2+Z_1)$. Thus, the greater the difference in the acoustic impedance values of two materials, the greater will be the amount of energy reflected by the boundary and the less efficient will be the acoustic energy transfer between them. When two materials have approximately the same acoustic impedance, the numerator of this ratio will approach zero, meaning that the energy reflection approaches zero and the transfer of energy between the materials will be very efficient.

For a gas turbine environment, the portion of the pressure transient sensed may be at a frequency of ~70 kHz, so it is reasonable to assume that the pressure transient force operates over a distance of one wavelength (at ~70 kHz) close to the acoustic waveguide. With a temperature near 1300° C. in the turbine combustor, the acoustic wave velocity in the gas is close to 700 m/sec. (velocity $\alpha$ $\sqrt{T}$). From this value, the acoustic wavelength ($\lambda$) at 70 kHz (c=f$\lambda$) is 1 cm. Consequently, the energy level for the $\pm 3$ lb/in$^2$ transient pressure change, is from energy=force X distance; (210×1) ergs, or $2.1\times10^{-5}$ Joules. Based upon previous embedded acoustic waveguide impact data, it has been shown that $2.1\times10^{-5}$ Joules of impact (pressure) energy can yield about 100 mV of signal level under ideal energy transfer conditions. This looks like an encouraging signal level, however the acoustic impedance mismatch between a gas and a platinum AWG sensor would result in only 0.4% to perhaps 1% of this energy level being sensed, or 0.4 to 1 mV. Thus, a challenge remains for such an acoustic waveguide pressure sensing system to positively detect these 0.4 to 1 mV transient signals.

Many materials may be considered for use as an acoustic waveguide for a pressure sensing application. The present inventors have used platinum successfully as an acoustic waveguide material in the harsh high temperature environment of a gas turbine engine. Other materials that may be considered for such a high temperature environment include zirconia, yttria stabilized zirconia, diamond, quartz, fused silica, cobalt, nickel, sapphire, alumina, and mullite. The present inventors have recognized that a multi-material waveguide may be particularly useful for a gas turbine combustor environment. A coating material may be used over an underlying core material to provide environmental protection for the core material. The coating material may also serve to improve the coupling of the waveguide with pressure fluctuations in the fluid by providing a graduated step between the acoustic impedances of the core material and the surrounding fluid.

Figure 2:
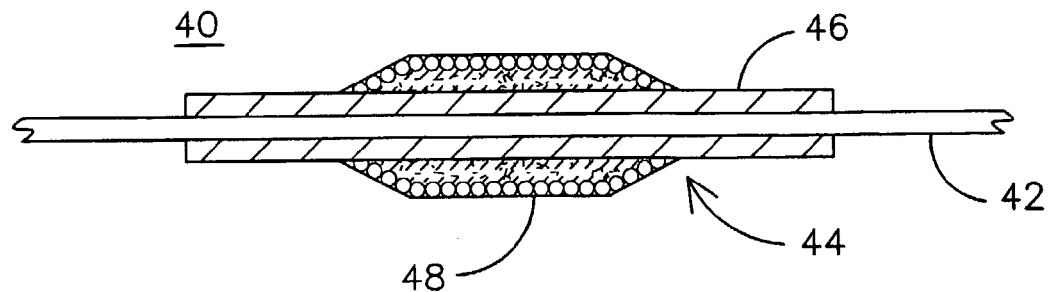
FIG. 2 is an acoustic waveguide having a core material and a protective coating material covering the core material.

FIG. 2 illustrates one embodiment of an acoustic waveguide 40 that may be used as part of a pressure sensing apparatus in a gas turbine engine. The acoustic waveguide 40 includes a core acoustic waveguide element 42 and a coating 44 covering the core acoustic waveguide element 42. The core material may be a 1 mm diameter platinum rod, for example, and the coating 44 may include a 3 mm diameter inner layer 46 of fused silica covered by a 15 mm diameter outer layer 48 of ceramic foam insulation. The ceramic foam insulation may include a generally solid first layer of ceramic bonded to the fused silica and covered by a ceramic foam of varying densities created by adding different sizes and quantities of hollow ceramic spheres (mullite for example) to the solid ceramic matrix material. Alternatives may include zirconia or alumina fibers or space shuttle tile material. Examples of ceramic foam insulation compositions are described in U.S. Pat. Nos. 6,013,592 and 6,197,424, incorporated by reference herein. The transition from the 15 mm diameter cross-section to the 3 mm diameter cross-section may be formed to have a 60° taper as shown in FIG. 2 in order to improve the transfer of acoustic signals from the larger diameter structure to the smaller diameter structure. In another embodiment, the coating 44 may be a single layer of yttria-zirconia. The coating 44 provides some protection to the core acoustic waveguide element 42 from the surrounding harsh fluid environment. The materials of the coating 44 also provide a stepped transition from the acoustic impedance of the platinum core 42 ($53.75 \times 10^6$ kg/m²/sec to the acoustic impedance of the surrounding combustion gas (0.0123 kg/m²/sec). In the multi-layer coating embodiment described above, fused silica has an acoustic impedance of 11.9 kg/m²/sec, the ceramic coating adjacent to the silica has an acoustic impedance of $4 \times 10^6$ kg/m²/sec, and the ceramic mixed with hollow mullite spheres added in layers with respective acoustic impedances of $1 \times 10^6$ kg/m²/sec, $0.3 \times 10^6$ kg/m²/sec, and $0.1 \times 10^6$ kg/m²/sec to interface with the acoustic impedance of the gas of $0.0123 \times 10^6$ kg/m²/sec. Consequently, this arrangement gives a multi-stepped transition from the acoustic impedance of the platinum core to that of the surrounding gas.

The improvement in the acoustic energy transfer provided by the use of the above-described multi-layer coating can be calculated by comparing the acoustic wave reflection ($R_0$) for a bare platinum wire in gas with that of the coated device described above. $R_0=(Z_2-Z_1) \div (Z_2+Z_1)$, so for the bare wire application where $Z_2$ is $53.75 \times 10^6$ kg/m²/sec and $Z_1$ is 0.0123 kg/m²/sec, the $R_0$ would be 0.9995 or 99.95% of the acoustic energy is reflected at the platinum/gas interface, and only 0.05% of the acoustic energy enters the platinum AWG. Such a low energy transfer would further complicate the task of detecting the pressure pulsations in the gas. For the insulated acoustic waveguide 40 described above, the total amount of reflection and transmission at each interface is shown in the attached Table 1. It can be seen from the table that the overall transmission of acoustic energy from the high-pressure gas to the platinum acoustic waveguide is:

0.22×0.50×0.46×0.4×0.50×0.37=0.0037=0.37%.

This is significantly improved over the amount of energy transferred from a gas to a bare wire AWG.

TABLE I

| Material | (ρC) Acoustic Impedance kg/m²/sec × $10^6$ | ($R_o$) Reflectivity Factor at Interface | (1 − $R_o$) Transmission Factor at Interface |
|---|---|---|---|
| Platinum | 53.75 | 0.63 | 0.37 |
| Fused Silica (First Coating) | 12 | 0.50 | 0.50 |
| Ceramic (Second Coating) | 4 | 0.60 | 0.40 |
| Ceramic Foam (Third Coating) (1 mm Mullite Spheres ~50%) | 1 | 0.54 | 0.46 |
| Ceramic Foam (Fourth Coating) (5 mm Mullite Spheres ~50%) | 0.3 | 0.50 | 0.50 |
| Ceramic Foam (Fifth Coating) (5 mm Mullite Spheres ~90%) | 0.1 | 0.78 | 0.22 |
| High Pressure Gas | 0.0123 | | |

Acoustic Impedance = Density $(\rho)$ × Wave Velocity (c) = $\rho C$.

Refectivity $(R_o) = \dfrac{\rho_1 C_1 - \rho_2 C_2}{\rho_1 C_1 + \rho_2 C_2}$

Transmission Factor = 1 − $R_o$

Figure 3:
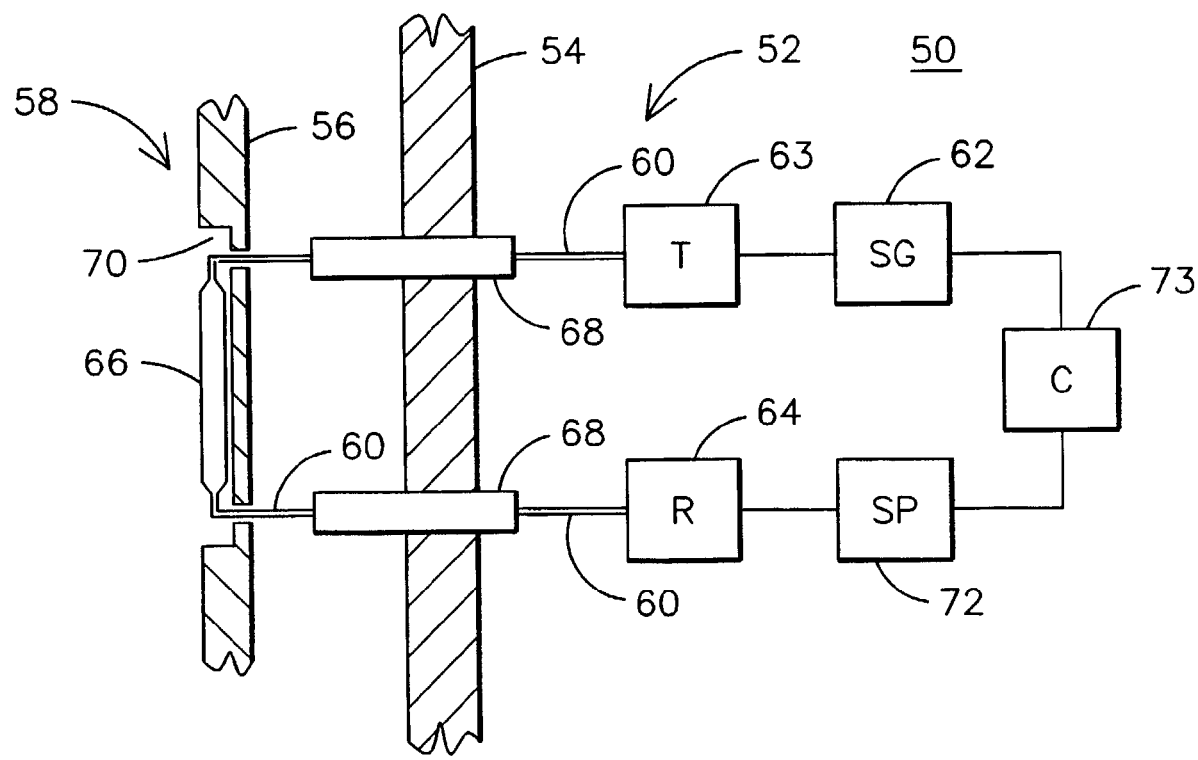
FIG. 3 is a schematic illustration of a gas turbine engine equipped with a pressure sensor utilizing an acoustic waveguide disposed in the combustor of the engine.

A gas turbine engine 50 equipped with a pressure sensing apparatus 52 is illustrated in schematic form in FIG. 3. The engine 50 includes an outer casing 54 surrounding a combustion basket 56 that defines a combustion chamber 58. The pressure sensing apparatus 52 includes an acoustic waveguide 60 that passes from an acoustic signal generator 62 located outside the casing 54, into and through the combustion chamber 58, and back out of the casing 54 to an acoustic signal transducer 64. In other embodiments a single transducer may be used for both generating and receiving the acoustic signal. Existing flashback thermocouple ports or UV inspection ports formed in the combustor wall 56 may be utilized or new dedicated ports may be formed. The acoustic waveguide 60 includes a portion 66 exposed to the combustion gas inside the combustion chamber 58. Other portions of the waveguide 60 may be supported within a metal capillary tube 68 that is affixed within the engine casing 54 and forms a pressure boundary passing through the pressure boundary of casing 54. The exposed portion 66 of the acoustic waveguide 60 is preferably placed within a laminar flow region of the combustor proximate wall 56, such as within a groove 70 formed in wall 56. The waveguide 60 is thus exposed to the pressure dynamics of the combustion chamber 58 without being directly exposed to the hot gas flow path. If it is necessary to collect data some distance away from wall 56 or in any area of turbulent flow, a traversing mechanism may be used to move the exposed portion 66 of the waveguide 60 between a measurement position in the turbulent flow region and a parked position in a laminar flow region.

Operation of the pressure sensing apparatus 52 may include using a signal generator 62 to control a transducer 63 in order to generate an acoustic signal in the waveguide 60. The signal traverses the acoustic waveguide 60 through portion 66 exposed to the combustion gas and travels to a transducer 64 at the opposed end of the waveguide 60. A signal processor 72 is used to analyze the received signals. Signals transmitted through the waveguide 60 may be continuous wave, such as a 70 kHz continuous wave transmitted above the background noise, or burst pulses of different repetition rate and frequency content. Small pressure variations in the combustion chamber 58 may be sensed by monitoring the modulation of continuous acoustic waves and/or by measuring signal attenuation and wave velocity changes in burst pulses. A controller 73 is used to control the operation of the apparatus 52, and the controller 73 may form part of an overall combustion control system (not shown). In order to differentiate the signal modulation caused by pressure pulsations from other sources of noise in the system, it may be beneficial to incorporate various filters and signal comparison circuits within signal processor 72 and/or controller 72. Depending upon the level of noise in the system, the signal modulation of interest may be only 1% or less of the level of the background noise. In such applications, a signal comparison circuit may be used to compare the signal passing through waveguide 60 to the signal passing through a similar reference waveguide (not shown) that has its sensing portion located in a region of the gas turbine engine 50 where no transients associated with the combustion process are expected, such as upstream of the combustor fuel nozzle. It is also possible to utilize pressure-sensing apparatus 50 in a listen-only mode wherein changes in the acoustic background signal are monitored and correlated to pressure pulsations in the combustion fluid.

Figure 4:
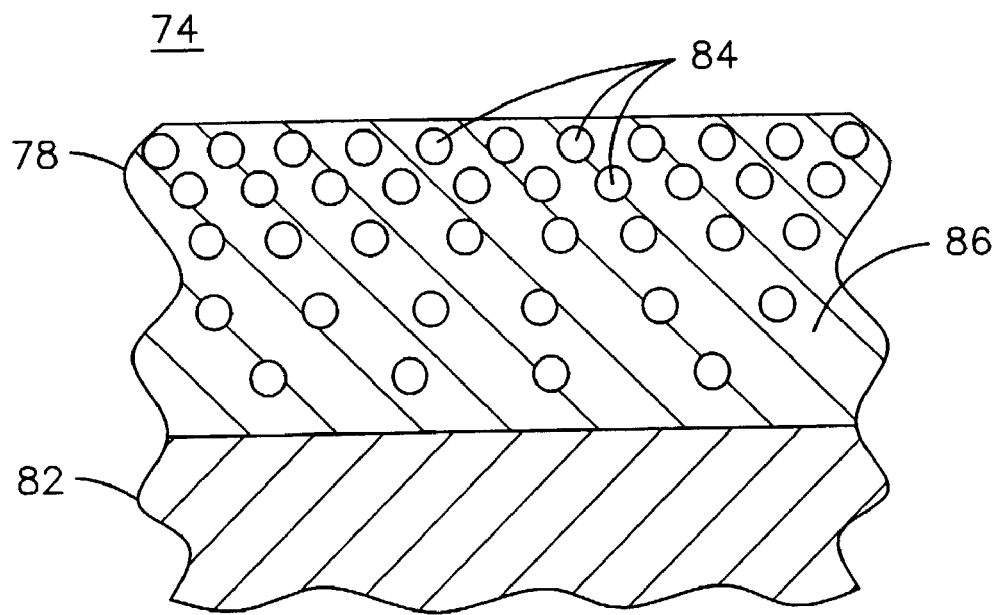
FIG. 4 is partial cross-sectional view of an acoustic waveguide having a graded coating.
Figure 5:
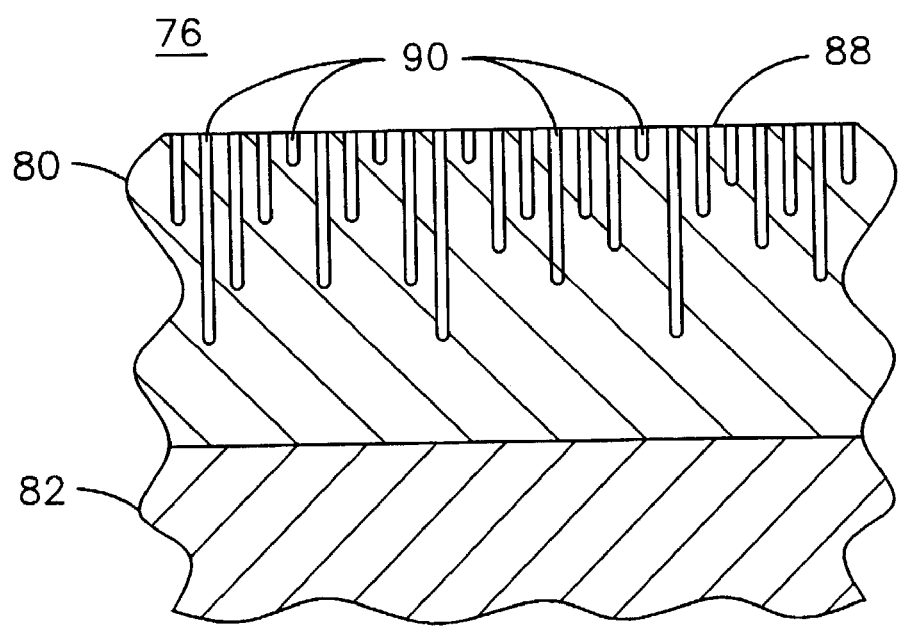
FIG. 5 is partial cross-sectional view of an acoustic waveguide having a second type of graded coating.

It may be beneficial to provide the sensing portion of the acoustic waveguide 60 with a graded coating material that has an acoustic impedance value that varies across the depth of the material. In this manner, a top surface of the coating may have an acoustic impedance value that is more closely matched to the acoustic impedance of the surrounding working fluid, while the bottom region of the coating may have an acoustic impedance value that is more closely matched to the acoustic impedance of the underlying core acoustic waveguide element. FIGS. 4 and 5 are partial cross-sectional views of two acoustic waveguides 74, 76 each having a respective coating 78, 80 disposed over a core acoustic waveguide element 82. Coating 78 of FIG. 4 has an acoustic impedance value that varies across its depth as a result of a graded density of hollow spheres 84 disposed in a matrix material 86 of the coating 78. One embodiment of such a material is similar to the material described in U.S. Pat. Nos. 6,013,592 and 6,197,424 previously discussed. Coating 80 of FIG. 5 has an acoustic impedance value that varies across its depth as a result of a plurality of voids 90 such as holes or grooves or other shapes formed to varying depths from the exposed top surface 88 of the coating 80. Such voids 90 may be formed by mechanical, thermal or chemical processes known in the art, for example, laser drilling.

It may also be advantageous to utilize a coating on a core acoustic waveguide element that has dimensions that act as a resonator for the acoustic energy passing through the waveguide. The coating may be formed to have a length along the core acoustic waveguide element approximately equal to an integer multiple of a wavelength in the material of an acoustic wave transmitted through the core acoustic waveguide element. This length of the layer of coating material is also selected to be approximately equal to an integer multiple of a wavelength in the core acoustic waveguide element of the acoustic wave transmitted through the core acoustic waveguide element. Thus the portion of the energy passing through the coating will reinforce the portion of the energy passing through the core element.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A pressure sensing element for use as part of a pressure sensing apparatus for detecting pressure fluctuations in a hostile fluid environment, the pressure sensing element comprising:
   a core acoustic waveguide element exhibiting a first acoustic impedance; and
   a coating disposed over the core acoustic waveguide element, the coating exhibiting a second acoustic impedance different than the first acoustic impedance, wherein the second acoustic impedance is a value between the first acoustic impedance and an acoustic impedance exhibited by a fluid surrounding the coating.

2. The pressure sensing element of claim 1, wherein the coating comprises a plurality of layers each exhibiting a different acoustic impedance.

3. The pressure sensing element of claim 1, wherein the coating comprises a plurality of layers wherein a layer disposed proximate the core acoustic waveguide element exhibits an acoustic impedance having a value between the first acoustic Impedance and an acoustic impedance exhibited by a layer disposed remote from the core acoustic waveguide.

4. The pressure sensing element of claim 1, wherein the coating comprises a graded material exhibiting a range of acoustic impedance values across its depth.

5. The pressure sensing element of claim 1, wherein the coating comprises a graded density across its depth.

6. The pressure sensing element of claim 1, further comprising an acoustic transducer connected to the core acoustic waveguide element for producing a signal responsive to changes in pressure in the hostile fluid environment.

7. The pressure sensing element of claim 1, further comprising a tube surrounding a portion of the core acoustic waveguide element that passes through a pressure boundary element for the fluid.

8. A pressure sensing apparatus for monitoring a combustion process in a gas turbine engine having a compressor producing compressed air, a combustor combusting a fuel in the compressed air to produce a combustion gas, and a turbine receiving the combustion gas, the pressure sensing apparatus comprising;
   an acoustic waveguide having a portion exposed to the combustion gas; and
   a transducer receiving an acoustic signal having passed through the acoustic waveguide.

9. The pressure sensing apparatus of claim 8, wherein the acoustic waveguide further comprises:

a core material extending from outside the gas turbine engine through the portion exposed to the combustion gas;

a coating material disposed on the core material along the portion of the acoustic waveguide exposed to the combustion gas.

10. The pressure sensing apparatus of claim 9, wherein the coating comprises a plurality of voids extending to respective different depths from an outside surface of the coating toward the core acoustic waveguide element.

11. The pressure sensing apparatus of claim 9, wherein the coating comprises a plurality of hollow spheres contained within a matrix material.

12. The pressure sensing apparatus of claim 11, wherein the concentration of hollow spheres within the matrix material is greater proximate an outer surface of the coating than proximate the core acoustic waveguide element.

13. The pressure sensing apparatus of claim 9, wherein the coating comprises a layer of material having a length along the core acoustic waveguide element approximately equal to an integer multiple of a wavelength in the material of an acoustic wave transmitted through the core acoustic waveguide element; and wherein the length of the layer of material is approximately equal to an integer multiple of a wavelength in the core acoustic waveguide element of the acoustic wave transmitted through the core acoustic waveguide element.

14. The pressure sensing apparatus of claim 9, wherein the core material comprises platinum, and wherein the costing material comprises:

a first layer comprising fused silica disposed on the platinum; and a second layer comprising mullite disposed on the first layer.

15. The pressure sensing apparatus of claim 9, wherein the coating material exhibits an acoustic impedance between an acoustic impedance of the core material and an acoustic impedance of the combustion gas.

16. The pressure sensing apparatus of claim 9, wherein the coating material comprises a graded material exhibiting a range of acoustic impedance values across its depth.

17. The pressure sensing apparatus of claim 9, wherein the coating material comprises a plurality of layers of material exhibiting respectively different acoustic impedance values between an acoustic impedance of the core material and an acoustic impedance of the combustion gas.

18. The pressure sensing apparatus of claim 8, wherein the portion of the acoustic waveguide exposed to the combustion gas is disposed within a recess in a structure of the gas turbine engine protected from direct impingement by a flow of the combustion gas.

19. The pressure sensing apparatus of claim 8, wherein the portion of the acoustic waveguide exposed to the combustion gas is disposed within a laminar flow region of the combustion gas.

* * * * *